United States Patent [19]

Hashimoto

[11] Patent Number: 6,137,987
[45] Date of Patent: *Oct. 24, 2000

[54] IMAGE INPUT APPARATUS OUTPUTTING INFORMATION IN ACCORDANCE WITH DEGREE OF MATCHING WITH A SPECIFIC ORIGINAL

[75] Inventor: Hideyuki Hashimoto, Toyokawa, Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/162,972

[22] Filed: Sep. 29, 1998

[30] Foreign Application Priority Data

Oct. 2, 1997 [JP] Japan ................................. 9-269814

[51] Int. Cl.⁷ .................................................. G03G 21/04
[52] U.S. Cl. ........................................... 399/366; 399/130
[58] Field of Search .................................. 399/130, 361, 399/365, 366; 358/448

[56] References Cited

U.S. PATENT DOCUMENTS

| | | | |
|---|---|---|---|
| 5,379,093 | 1/1995 | Hashimoto et al. | 399/366 |
| 5,390,003 | 2/1995 | Yamaguchi et al. | 399/366 |
| 5,424,807 | 6/1995 | Ohmura | 399/366 |
| 5,565,962 | 10/1996 | Yoshimoto | 399/366 |
| 5,604,596 | 2/1997 | Ukai et al. | 358/448 X |
| 5,621,503 | 4/1997 | Komaki et al. | 399/366 |

FOREIGN PATENT DOCUMENTS

| | | |
|---|---|---|
| 6-62234 | 3/1994 | Japan . |
| 6-178066 | 6/1994 | Japan . |

*Primary Examiner*—Sandra Brase
*Attorney, Agent, or Firm*—Sidley & Austin

[57] ABSTRACT

An image input apparatus calculates degree of matching between read original and a specific original of a bank note, for example, stored in advance. In accordance with the result of calculation, destination of information transmission data to be output externally is selectively determined, and the information is transmitted to the determined destination. As a result, an image reading apparatus is provided which allows transmission of determination information of the specific original to a necessary site, in accordance with the degree of matching between the read original and the specific original.

18 Claims, 6 Drawing Sheets

| DEGREE OF MATCHING | DESTINATION | CONTENT | DEGREE OF EMERGENCY |
|---|---|---|---|
| 100 | S1, S2, S3, S4, S5, S6 | TRANSMISSION LEVEL A | HIGH ↑↓ LOW |
| ⋮ | ⋮ | ⋮ | |
| a | S1, S2, S3, S4, S5 | TRANSMISSION LEVEL B | |
| ⋮ | ⋮ | ⋮ | |
| b | S1, S2, S3, S4 | TRANSMISSION LEVEL C | |
| ⋮ | ⋮ | ⋮ | |
| c | S1, S2, S3 | TRANSMISSION LEVEL D | |
| ⋮ | ⋮ | ⋮ | |
| d | S1, S2 | TRANSMISSION LEVEL E | |
| ⋮ | ⋮ | ⋮ | |
| 0 | S1 | TRANSMISSION LEVEL F | |

IMAGE INPUT APPARATUS OUTPUTTING INFORMATION IN ACCORDANCE WITH DEGREE OF MATCHING WITH A SPECIFIC ORIGINAL

This application is based on application No. 9-269814 filed in Japan, the content of which is hereby incorporated by reference.

BACKGROUND OF THE INVENTION

1. Field of the Invention

The present invention relates to an image input apparatus. More specifically, the present invention relates to an image input apparatus used for an apparatus having a function of reading an original, such as a copying machine and a facsimile.

2. Description of the Related Art

An image reading apparatus reading an original image and outputting image data has been known. The image reading apparatus has been used conventionally as an input apparatus for an equipment which requires conversion of an original to image data, such as a copying machine and a facsimile.

In the technical field of copying machines, fidelity in reproducing original image has been much improved by the development of a digital color copying machine. This gives rise to a problem that a specific original, which should not be copied considering public peace and good order, is copied. The specific original includes bank notes and securities, of which copying is prohibited.

As a technique for preventing copying of the specific original, a technique for determining whether a specific original is read by an image reading apparatus or not has been proposed. Proposals made in Japanese Patent Laying-Open Nos. 6-62234 and 6-178066 will be described as representative examples of such technique.

Japanese Patent Laying-Open No. 6-62234 discloses a technique in which dictionary data having specific feature information of the specific original stored in advance is compared and collated with image data of an original read actually, and dependent on the result of comparison, whether or not the original is the specific original is determined. Japanese Patent Laying-Open No. 6-178066 discloses a technique in which pattern data of the specific original which is referred to for comparison and collation to determine whether the original is the specific original is stored in a service center, the pattern data is down loaded through a communication line from the service center to an image reading apparatus, and using the pattern data, whether or not the actually read original is the specific original is determined. Though the conventional image reading apparatus described above is capable of distinguishing the specific original, it has the following problem. In the conventional image reading apparatus, when it is determined that the specific original has been read, the information of this determination of the specific original is not externally output. Therefore, it has been impossible for an outside agent, for example an information managing center, to comprehend the result of determination or distinction of the specific original. Therefore, even when the specific original of which copying is prohibited is copied, sufficient management has been impossible.

For effective management of reading of the specific original, it is necessary to take different measures to the reading of the specific original dependent on the degree of matching between the read original and the specific original. More specifically, if the degree of matching is high, the reading is recognized as an illegal act. Therefore, an emergency measure, such as strict control of the user by a supervising agency is necessary. When the degree of matching is not so high, it may not actually be the specific original, considering error in collation. In that case, not the emergency measure but a simple warning given to the user by a managing apparatus such as an alarm provided on the site may be necessary. Conventionally, however, such management of taking different measures dependent on the degree of matching has not been taken.

SUMMARY OF THE INVENTION

Therefore, an object of the present invention is to provide an image reading apparatus capable of transmitting determination information related to the specific original to a necessary destination, dependent on the degree of matching between the read original and reference data for the specific original.

Another object of the present invention is to provide an image reading apparatus capable of transmitting necessary information to an external apparatus only when necessary.

The above described objects of the present invention is attained by the image input apparatus in accordance with the present invention including an input unit for inputting image data, a calculator comparing input image data with a pre-stored reference data for calculating degree of matching between the image data and the reference data, and a controller for controlling a destination of output for outputting information related to the result of calculation, in accordance with the calculated degree of matching.

The degree of matching between the input image data and the reference data is calculated and in accordance with the calculated degree, the destination of output of the information related to the result of calculation is controlled. Therefore, it is possible to send determination information related to the specific original to a necessary site or destination, in accordance with the degree of matching with the reference data such as the data of the specific original.

According to another aspect of the present invention, the image reading apparatus includes a reader for reading an image of an original and converting the image to image data, a memory storing determination reference data for determining whether the original is the specific original, specific original determining unit collating the image data read by the reader with the determination reference data, for determining whether the original is the specific original, an information output unit for outputting information corresponding to the result of determination to an external apparatus, and a controller calculating degree of matching between the image data read by the reader and the determination reference data, for controlling said information output unit as to whether information is to be output or not, dependent on the degree of matching.

Dependent on the degree of matching between the original read by the reader and the specific original, the determination of whether the original is the specific original and should be outputted to an external apparatus is made. Therefore, the data is transmitted to the external apparatus only when it is necessary.

According to a further aspect of the present invention, the image reading apparatus includes an image reader for reading an original image and converting the image to image data, a memory storing determination reference data means for determining whether the original is the specific original, a specific original determining unit for collating the image data read by the image reader with the determination reference data and, for determining whether the original is the specific original, an information output unit for outputting information corresponding to the result of determination to an external apparatus, and a controller calculating degree of matching between the image data read by the reader and the determination reference data, for controlling destination of output of the information from the information output unit dependent on the degree of matching.

The destination of information externally outputted from the information output unit is selectively determined dependent on the degree of matching between the original read by the reader and the specific original, necessary determination information can be transmitted to necessary site or destination, dependent on the degree of matching of the read original with the specific original.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the drawings. In the following embodiments, an image reading apparatus used for a copying machine will be described as an example of the image input apparatus. The present invention, however, is also applicable to image reading apparatus used for other apparatuses such as a facsimile. Further, other image input apparatus such as a personal computer, a CCD camera or the like may be used.

Figure 1:
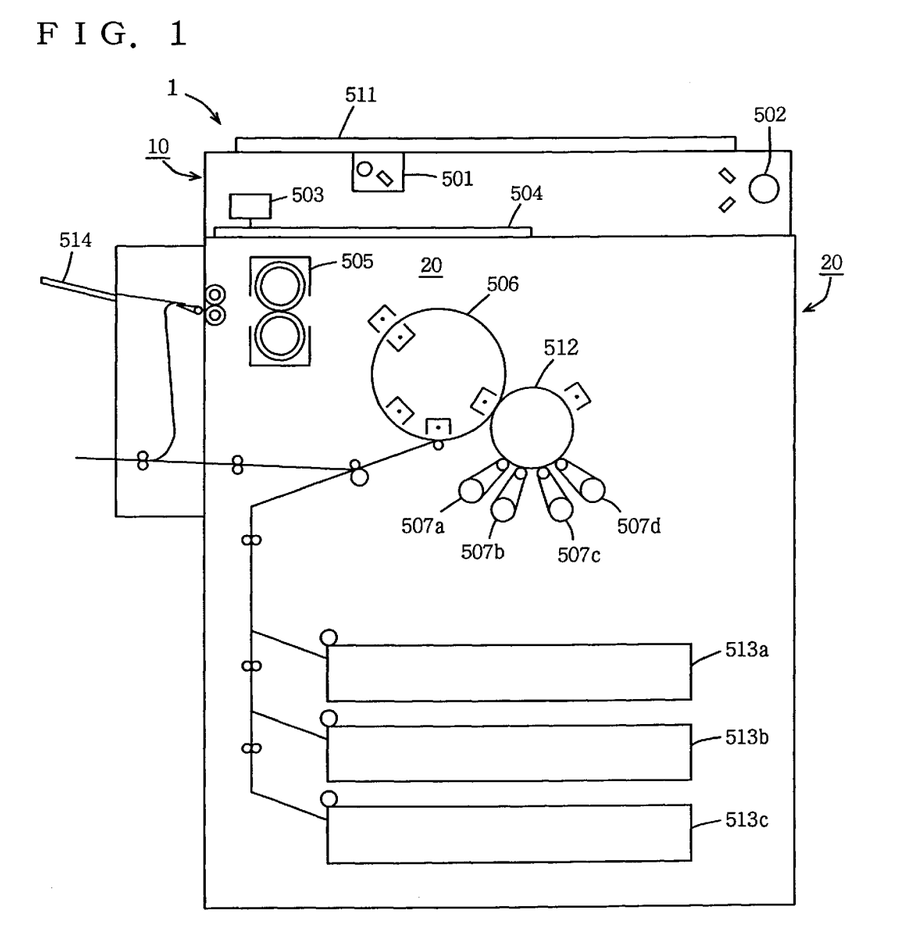
FIG. 1 is a vertical section showing an internal configuration of the copying machine provided with the image reading apparatus.

FIG. 1 is a vertical section showing the internal configuration of a copying machine provided with an image reading apparatus. Referring to FIG. 1, a copying machine 1 can be divided, in a broad sense, an image reading apparatus 10 and a printer 20. Image reading apparatus 10 includes a platen 511, a lamp 501, a motor 502, an image reading unit 503 and an image processing unit 504.

An original to be copied is placed on platen 511. The image of the original placed on platen 511 is exposed and scanned by light emitted from lamp 501. The exposed and scanned original image is subjected to photoelectric conversion by image reading unit 503 which is formed of an image sensor such as a CCD, and converted to image data. The original image is read by such conversion to image data. The original image data read by the image reading unit 503 is applied to image processing unit 504, and prescribed image processing is performed in image processing unit 504.

Image processing unit 504 includes a CPU, a ROM and RAM (not shown). In image processing unit 504, the CPU reads and executes an image processing program stored in the ROM and, using the RAM as a work area, prescribed image processing is performed on the image data. The image data which has gone through the prescribed image processing by imaging processing unit 504 is applied to printer 20.

In the image processing unit 504, in addition to the normal image processing, various processes such as a process for determining a specific original, a process for preventing illegal copying of the specific original and so on are performed. Here, the specific original includes bank notes and securities, of which copying is prohibited.

In printer 20, an electrostatic latent image is formed on a surface of a photoreceptor drum 512 based on the image data applied from image processing unit 504. The electrostatic latent image is toner-developed by developers 507a to 507d for developing in toner of four different colors, and the electrostatic latent image is transferred to a surface of a sheet held on a transfer drum 506. Here, the sheet held on transfer drum 506 is conveyed from any of container cassettes 513a to 513c to transfer drum 506. The sheet on which the image is transferred is thereafter separated from transfer drum 506 and fed to a fixing unit 505. The fixing unit 505 fixes the image on the sheet. The sheet on which the image is fixed is discharged to a discharge tray 514.

Figure 2:
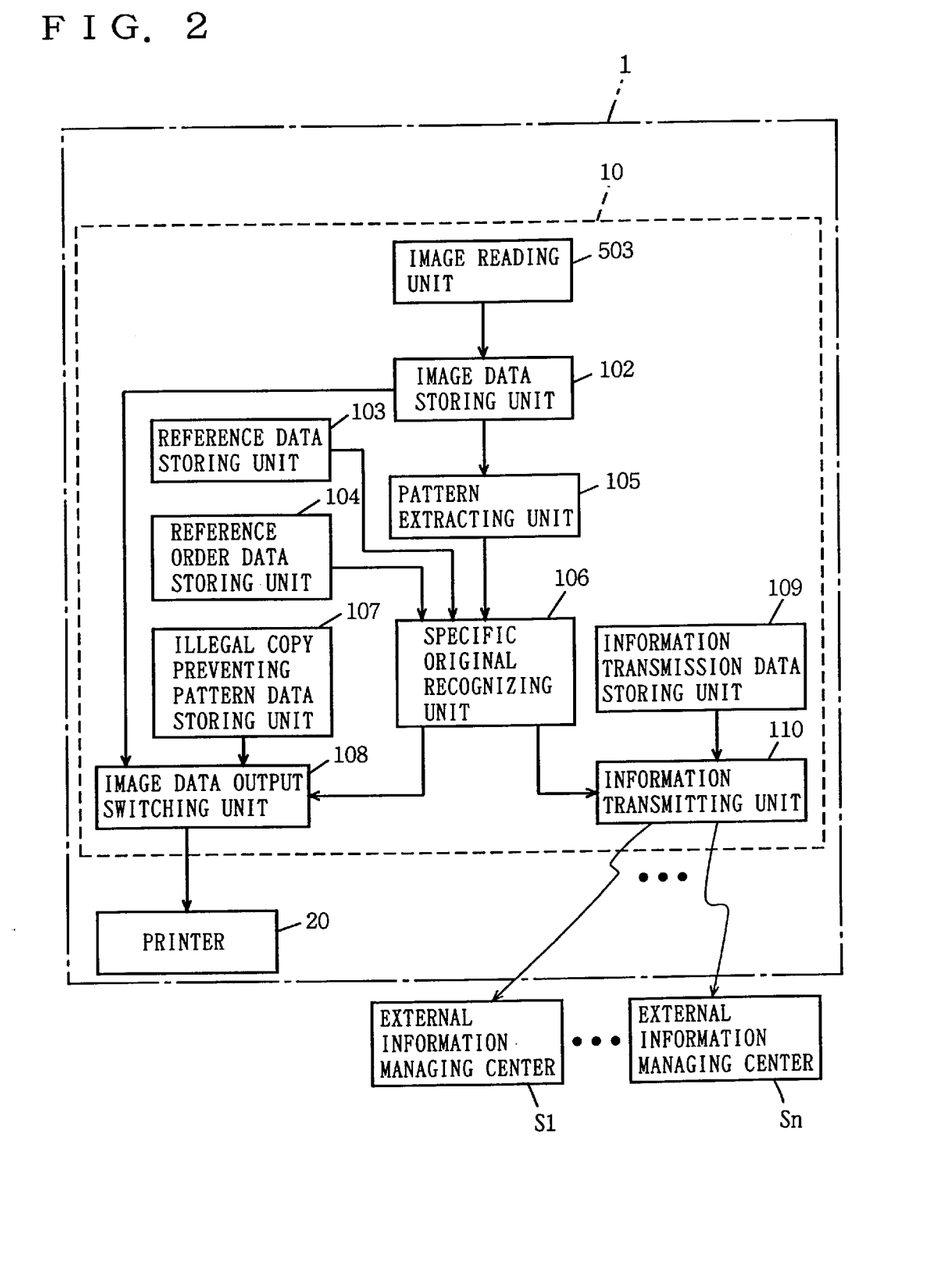
FIG. 2 is a block diagram showing configuration of a specific original determining function unit in the image reading apparatus.

The function of determining the specific original in image reading apparatus 10 will be described. FIG. 2 is an overall block diagram showing configuration of the specific original determining function unit in image reading apparatus 10. In FIG. 2, portions common to those of FIG. 1 are denoted by the same reference characters and description thereof is not repeated.

Referring to FIG. 2, image reading apparatus 10 includes an image reading unit 503, an image data storing unit 102, a reference data storing unit 103, a reference order data storing unit 104, a pattern extracting unit 105, a specific original recognizing unit 106, an illegal copy preventing pattern data storing unit 107, an image data output switching unit 108, an information transmission data storing unit 109 and an information transmitting unit 110. Outside copying machine 1 provided with image reading apparatus 10, there are a plurality of external information management centers S1 to Sn.

Pattern extracting unit 105 and specific original recognizing unit 106 are included in the CPU. Image data storing unit 102 is included in the RAM. Reference data storing unit 103, reference order data storing unit 104 and illegal copy preventing pattern data storing unit 107 are included in the ROM.

As already described, image reading unit 503 reads an image of the original to be copied, converts the read image to image data, and applies the image data to image data storing unit 102. Image data storing unit 102 temporarily stores the image data applied from image reading unit 503.

Specific original recognizing unit 106 executes data collation as will be described later, and recognizes the specific original by determining whether or not the read original is the specific original. Reference data storing unit 103 stores reference data used for determining the specific original in the specific original recognizing unit 106. The reference data represents an image pattern of the specific original, and is referred to at the time of collation for determining the specific original. In order to enable distinction of a plurality of different specific originals such as various bank notes and various securities, various different reference data corresponding to respective ones of the specific originals to be distinguished are stored in reference data storing unit 103.

In reference order data storing unit 104, a plurality of different reference order data is stored, which represents the order of the plurality of different reference data to be used for collation to distinguish the specific original. In order to adjust the order of using the reference data for collation to distinguish the specific original in accordance with the environment of use of the image reading apparatus 10, that is, the environment of use of copying machine 1, a plurality of different reference order data is stored in reference order data storing unit 104, and these are used selectively in accordance with the environment used.

Pattern extracting unit 105 extracts a pattern of the original image data read and stored in image data storing unit 102, and applies pattern data representing the pattern to specific original recognizing unit 106.

Specific original recognizing unit 106 reads the reference order data which suits the environment used of the image reading apparatus 10, that is, the environment of use of copying machine 1, from reference order data storing unit 104, and sets the order of reference represented by the reference order data, as the order of distinction of the specific original. Specific original recognizing unit 106 successively reads reference data from reference data storing unit 103 in accordance with the reference order set in accordance with the environment used, successively compares and collates the data of the pattern of the specific original represented by the read reference data with the pattern data of the original image applied from pattern extracting unit 105, and based on the result of collation, determines whether the specific original is included in the read original.

Image data output switching unit 108 is for selectively reading and outputting to printer 20 the original image data stored in image data storing unit 102 and an illegal copy preventing image data stored in illegal copy preventing pattern data storing unit 107. The data output from image data output switching unit 108 is switched in response to a switching signal applied from specific original recognizing unit 106. The illegal copy preventing image data is an image data predetermined for preventing illegal copy of the specific original, which includes an image data indicating that copying of the specific original is prohibited.

The illegal copy preventing image data is not limited to the image data indicating that illegal copying of the specific original is prohibited, and it may be a simple image data indicating that copying of the read original is not possible, or any other image data such as an arbitrary figure or just a black image. More specifically, the illegal copy preventing image data may be any data other than the image data of the specific original. Further, the illegal copy preventing image data may not be output and copying of the specific original may simply be inhibited.

From the result of determination as to whether the specific original is included as described above, when it is recognized that the specific original is not included in the read original, specific original recognizing unit 106 applies a switching signal for outputting the read image data to image data output switching unit 108. In response to the switching signal, image data output switching unit 108 reads and applies to printer 20 the original image data stored in image data storing unit 102. Accordingly, when the specific original is not included in the read original, the read original is copied.

Conversely, based on the result of determination as to whether the specific original is included or not, if it is recognized that the specific original is included in the read original, specific original recognizing unit 106 applies a switching signal for outputting the illegal copy preventing pattern data to image data output switching unit 108. In response to the switching signal, image data output switching unit 108 reads and applies to printer 20 the illegal copy preventing pattern data stored in illegal copy preventing pattern data storing unit 107. Accordingly, when the specific original is included in the read original, the read original is not copied but a predetermined image for preventing illegal copy is printed on a sheet and output from printer 20.

In this manner, based on the result of determination as to whether the specific original is included, when it is recognized that the specific original is included in the read original, the specific original recognizing unit 106 applies an instruction signal for outputting information transmission data to the outside of copying machine 1, to information transmitting unit 110. The instruction signal includes information designating the type of content to be transmitted of the information transmission data, and information designating destination of transmission of the information transmission data.

Information transmitting unit 110 is for externally transmitting the information transmission data stored in information transmission data storing unit 109 to the outside of the copying machine, and it operates in response to the instruction signal from specific original recognizing unit 106 when the specific original is included in the read original. Here, the information transmission data is information pre-determined for transmitting the information that the specific original is included in the read original, to the outside.

When the instruction signal is received from the specific original recognizing unit 106, information transmitting unit 110 selectively reads the information transmission data stored in the information transmission data storing unit 109, in accordance with the content of instruction of the instruction signal. Information transmitting unit 110 transmits the information transmission data to a designated one of the external information managing centers S1 to Sn. External information managing centers S1 to Sn are agents for information management, such as management of operation states of a number of copying machines, outside copying machine 1, each for different object of management. The external information managing centers S1 to Sn also have supervising agents to supervise the reading of specific originals. Additionally, other agents are simply for information management, e.g. the management of the operating conditions of the copying machines.

In this manner, when the specific original is included in the read original, the information transmission data representing the fact is transmitted to the selected external information managing center. Therefore, it can be readily noticed at external information managing centers S1 to Sn outside copying machine 1 that the specific original is included in the read original, based on the information transmission data.

Further, specific original recognizing unit 106 applies an instruction signal to information transmitting unit 110 asking external information managing centers S1 to Sn to transmit simulation information for determining communication state. The simulation information is similar to information transmission data, and it is used for determining whether the information transmission data is normally transmitted from information transmitting unit 110 and whether external information managing centers S1 to Sn conduct normal information management upon reception of the information transmission data.

Information transmission data storing unit 109 stores regular information transmission data and the above described simulation information. Information transmitting unit 110 reads simulation information from information transmission data storing unit 109 in response to an instruction signal from specific original recognizing unit 106, and transmits the simulation information to external information managing centers S1 to Sn. External information managing centers S1 to Sn transmit a signal indicative of satisfactory reception, when the simulation signal is received, to information transmitting unit 110. Accordingly, the CPU of image processing unit 505 determines whether or not the information transmission data from information transmitting unit 110 can be transmitted normally.

Further, in each of the external information managment centers S1 to Sn, a prescribed monitoring apparatus monitors whether a managed equipment operates normally upon reception of the simulation information, enabling determination as to whether the external information managing centers S1 to Sn are capable of normal information management upon reception of the information transmission data.

By transmitting simulation information from information transmitting unit 110, it is possible to determine as to whether the state of communication of information transmission data is satisfactory or not.

The process for setting the order of collation, which is the order of reference of reference data in specific original recognizing unit 106, will be described. First, the concept of the process of reading reference order data from reference order data storing unit 104 will be described.

Figure 3:
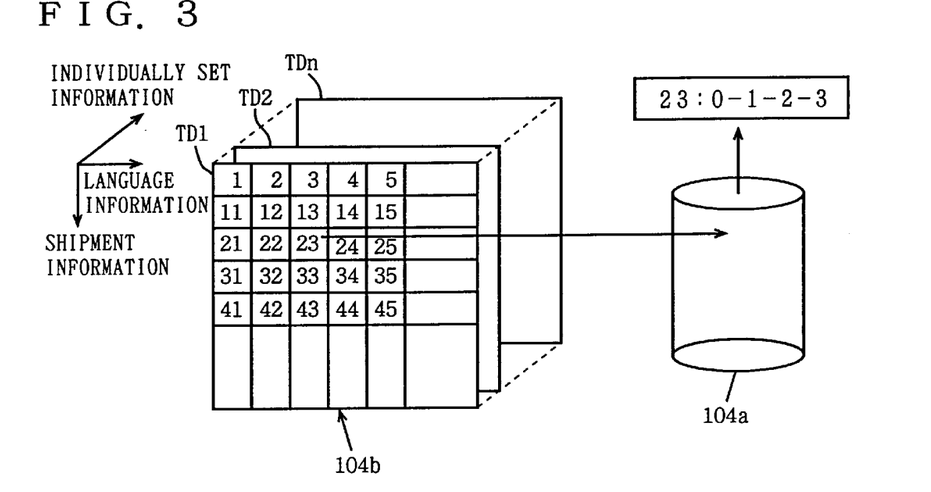
FIG. 3 is an illustration showing the concept of the process for reading reference order data from a reference order data storing unit.

FIG. 3 is an illustration of the concept of the process for reading reference order data storing unit 104.

Referring to FIG. 3, reference order data storing unit 104 includes a reference order data unit 104*a* and a label data unit 104*b*. Reference order data unit 104*a* refers to a data file consisting of data including a plurality of different reference order data and corresponding label numbers. Here, label numbers are numbers allotted to respective ones of the plurality of different reference order data, and the label number allows identification of the reference order data.

Label data unit 104*b* is a file consisting of data representing, in the form of a table, relation between environment of use of copying machine 1 and label numbers of reference order data. The environment of use of copying machine 1 includes shipment information representing shipment destination of copying machine 1 (region where copying machine 1 will be used), language information representing the language (Japanese, English or other language) used by copying machine 1, and individual setting information representing information individually set for the copying machine 1. The shipment information, language information and individual setting information are stored in the RAM by a predetermined information setting process. The shipment information, language information and individual setting information may be stored in advance in the ROM.

Label data unit 104*b* contains a plurality of table data TD (TD1, TD2, . . . , TDn) corresponding to respective individual setting information, in which label numbers 1, 2, . . . 44, . . . are determined corresponding to correlation of shipment information and language information, respective information serving as parameters. In other words, basically, the label number is determined based on the correlation between shipment information and language information, while relation among the label number and the shipment information and the language information differ dependent on individual set information. In the example shown in FIG. 3, a label number 23 is determined based on the correlation between each of shipment information, language information and individual set information.

When the label number is determined, of the data in label data unit 104*b*, reference order data corresponding to the determined label number is read. In this manner, the reference order data is determined based on the label number. FIG. 3 shows an example in which reference order data of label number 23 is in the order of 0-1-2-3 (reference data 0-reference data 1-reference data 2-reference data 3).

In each reference order data, the order of reference data is determined starting from the one having highest possibility of use in the environment of use of copying machine 1, that is, the environment of use of image reading apparatus 10.

Figure 4:
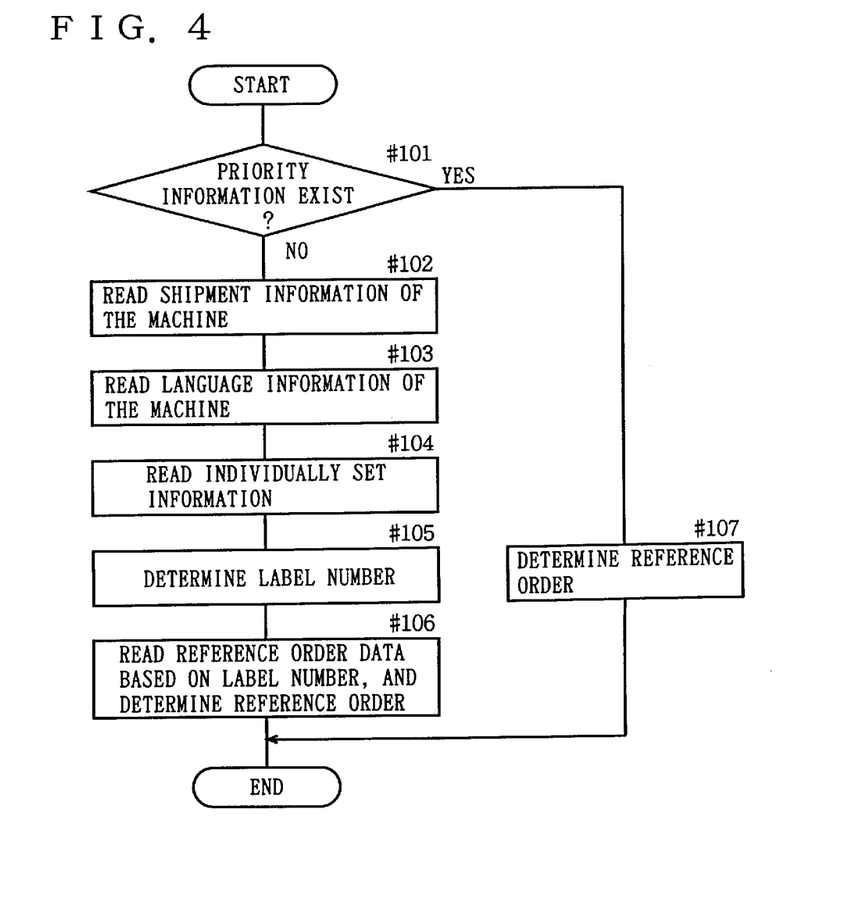
FIG. 4 is a flow chart showing process steps of a reference order data setting process.

The reference order data setting process, which is a specific process for determining and setting reference order data will be described. FIG. 4 is a flow chart showing the steps of reference order data setting process.

Referring to FIG. 4, first, in step #101, whether there is priority information or not is determined. Here, the priority information refers to information determining priority of use of reference data for collation. When the priority of use of reference data for collation is determined in advance, priority information indicating the order of priority is stored in the ROM or the RAM. When it is determined in step #101 that there is the priority information, the flow proceeds to step #107, the reference order is determined in accordance with the priority information, and the reference order data setting process is terminated. The priority information is not read from the file shown in FIG. 3, but arbitrarily input by an operation of a user or a manager.

Meanwhile, if it is determined that there is no priority information in step #101, the flow proceeds to step #102, in which shipment information of the machine is read. Thereafter, the flow proceeds to the step #103, in which language information of the machine is read. Thereafter, the flow proceeds to step #104, in which individual setting information is read.

Thereafter, the flow proceeds to step #105 and, in the manner as shown in FIG. 3, based on the read shipment information, language information and individual setting information, the label numbers are determined. Thereafter, the flow proceeds to step #106 in which reference order data is read based on the label numbers in the manner shown in FIG. 3, and the reference order is determined in accordance with the read reference order data. Then reference order data setting process is terminated.

In this manner, if there is priority information, the reference order is determined based on the priority information and if not, the reference order is determined based on shipment information, language information and individual setting information. When the reference order is determined in this manner, the order of reference data used for collation of data to distinguish the specific original is set to the reference order in accordance with the determination.

As described above, the reference order of reference data is set in accordance with the environment of use of the copying machine 1, that is, the environment of use of image reading apparatus 10. Further, the reference order of reference order data is determined such that reference data of which possibility of use in each environment is high has high order. Therefore, it is possible to distinguish the specific original in the order appropriate for the environment of use of copying machine 1, that is, environment of use of image reading apparatus 10.

In the present embodiment, the shipment information, the language information and the individual setting information are used as factors determining the environment of use. The factors are not limited thereto and other factors may be newly added to the aforementioned factors, or factors other than those mentioned above may be used for identifying the environment of use.

Figure 5:
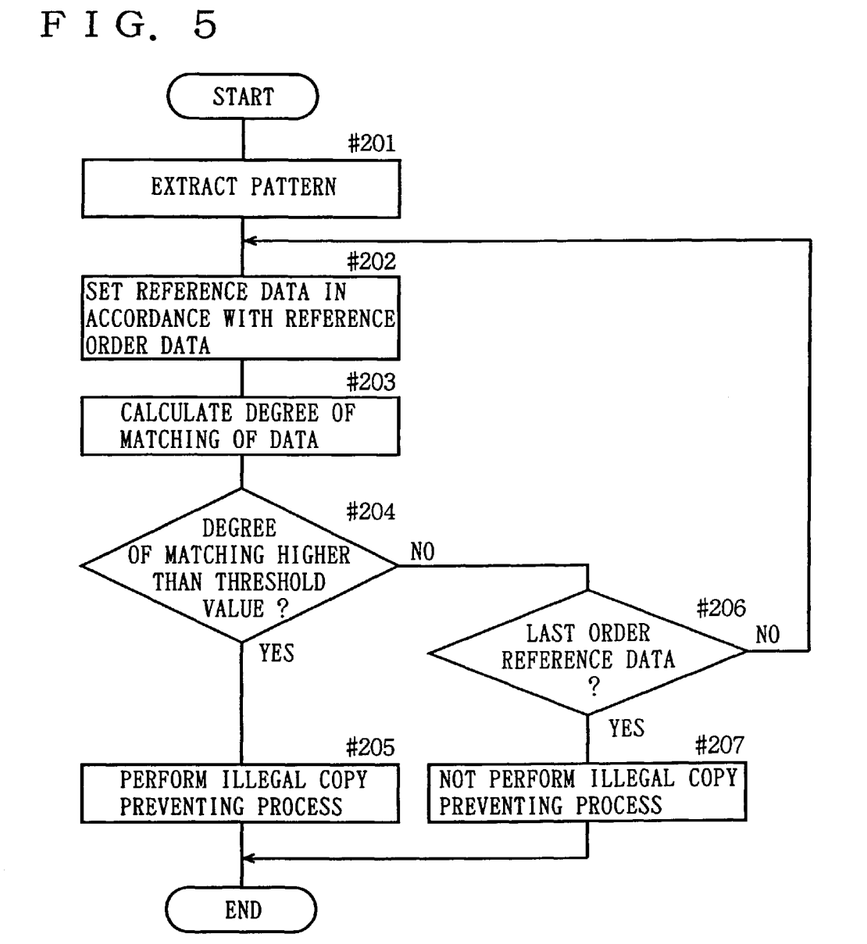
FIG. 5 is a flow chart showing process steps of a specific original determining process.

A specific original determining process will be described in the following, which is the process for determining whether the read original is the specific original and for handling the image data in accordance with the result of determination, in specific original recognizing unit 106. FIG. 5 is a flow chart showing the steps of specific original determining process.

Referring to FIG. 5, first, in step #201, the image pattern data extracted from pattern extracting unit 105 is read. In step #202, reference data to be collated next is determined in accordance with the order represented by the reference order data, and that reference data is read from reference data storing unit 103 and set as collation data.

Thereafter, in step #203, the reference data of the specific original set as the collation data is compared and collated with the image pattern data of the read original, and by a prescribed matching degree calculating process, the degree of matching between the original image pattern data and the reference data of the specific original is calculated.

Thereafter, in step #204, whether the degree of matching calculated in step #203 is higher than a predetermined threshold value of the degree of matching is determined. The threshold value here is set such that the value allows for a determination as to whether the read original is the specific original. Therefore, when the degree of matching exceeds the threshold value, the read original is determined to be the specific original and if the degree of matching is not higher than the threshold value, the read original is determined not to be the specific original. It is necessary that the threshold value here is set such that it allows determination of the specific original without fail, taking into account process error in calculating the degree of matching.

When it is determined in step #204 that the degree of matching is higher than the threshold value, the read original is determined to be a specific original of that type, which is an object of comparison and collation. The illegal copy preventing process is performed in step #205, and the specific original determining process is then terminated. Here, the illegal copy preventing process includes the process for applying a switching signal from specific original recognizing unit 106 to image data output switching unit 108 for outputting the illegal copy preventing pattern data, so that the illegal copy preventing pattern data is output to the printer 20, and the process in which an instruction signal for outputting information transmission data is transmitted to information transmitting unit 110 so that the information transmission data is transmitted to information managing centers outside the copying machine 1 from information transmitting unit 110.

When it is determined in step #204 that the degree of matching is not higher than the threshold value, it is determined that the read original is not the specific original of the type which is the object of comparison and collation, and in step #206, whether the reference data is the last data in accordance with the reference order data, is determined. If it is determined that the reference data is not the last one in step #206, the flow returns to step #202, reference data of the next order is set, and the above described process of comparison and collation is repeated using the reference data. Namely, comparison and collation are performed using a plurality of different reference data in the order in accordance with the reference order data.

If it is determined that the read original is the specific original by the end of comparison and collation of the reference data of the last order, the above described illegal copy preventing process takes place at this time. If the determination to be the specific original is not made by the comparison and collation up to the last reference data, the read original is determined not to be the specific original. Accordingly, the flow proceeds to step #207, and the illegal copy preventing process is not performed. A switching signal is applied from specific original recognizing unit 106 to image data output switching unit 108 so that the image data of the read original is output, and the process of outputting the image data of the read original to printer 20 is performed. In this manner, normal copying is done. After step #207, the specific original determining process is terminated.

The specific original determining means for determining whether the specific original is included in the read original is implemented by the above described specific original determining process.

In the specific original determining process, a plurality of different reference data are compared and collated successively with the image data of the original image, so as to distinguish the specific original. In the reference order data setting process, the order of reference is determined based on the reference order data specifying the order of data to be referenced with the higher possibility of use in each environment of use set at a higher order. Therefore, no matter in what environment the machine is used, the specific original can be found at relatively early stage or at a higher order of the reference data.

In the copying machine 1, as already described, destination and content of transmission of the information transmission data are selected and determined in accordance with the degree of matching between the read original and the specific original, and the information transmission data of the determined content is transmitted to the determined destination. The process for selecting and determining the destination and the content of transmission of the information transmission data in accordance with the degree of matching between the read original and the specific original will be described in the following.

The relation between each of the degree of matching with the specific original, the destination of transmission of the information transmission data, the content of transmission, and degree of emergency will be described.

Figure 6:
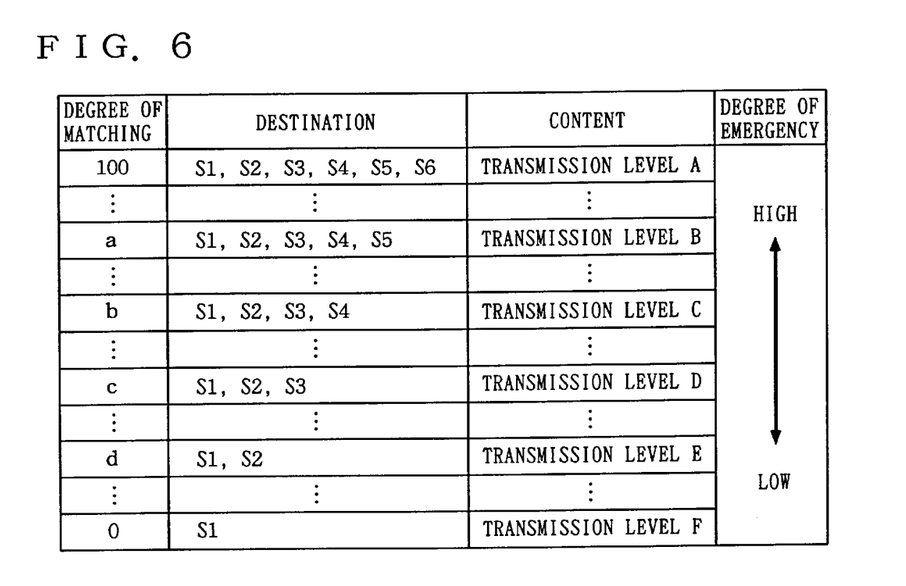
FIG. 6 shows, in the form of a table, relation between each of degree of matching, transmission destination of information transmission data, content of transmission and degree of emergency.

FIG. 6 shows, in the form of a table, the relation between each of the degree of matching, the destination of transmission of the information transmission data, the content of transmission and the degree of emergency. Referring to FIG. 6, the degree of matching is classified into a plurality of stages (100%, a %, b %, . . . ) with 100% representing the highest degree, and for respective stages, destinations of transmission (S1, S2, . . . ) and contents of transmission (transmission level A, transmission level B, . . . ) are determined in advance. The number of destinations here increases as the degree of matching attains higher. The degree of emergency represents the degree of emergency in taking any measure against the act of reading the specific original. The higher the degree of matching, the higher the degree of emergency. Therefore, when the degree of matching between the specific original and the read original attains higher, the countermeasures should be taken urgently.

The relation between each of the degree of matching and the destination and the contents of transmission is stored as data in the form of a table in the ROM, and the data is used in the information transmission data selecting process executed for selecting the destination of transmission of the information transmission data and the type of contents of the transmission.

Figure 7:
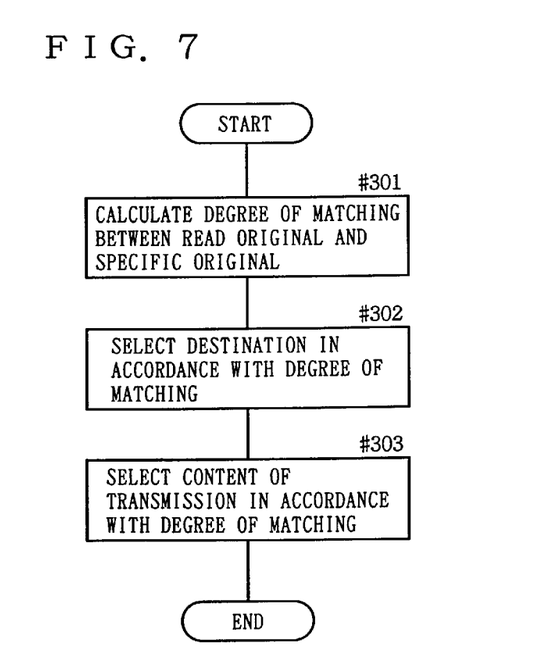
FIG. 7 is a flow chart showing process steps of an information transmission data selecting process.

The content of the information transmission data selecting process for selecting the destination of the information transmission data and the type of transmission contents will be described in the following. FIG. 7 is a flow chart showing the steps of the information transmission data selecting process.

First, in step #301, reference data of the specific original set as the data for collation is compared and collated with the image pattern data of the read original, and a prescribed degree of matching calculating process is performed to calculate the degree of matching between the data patterns. The degree of matching may not be calculated in step #301, and the degree of matching found in the specific original determining process may be used.

In step #302, the process of selecting and determining the destination of transmission of the information transmission data in accordance with the calculated value of the degree of matching is performed. Thereafter, in step #303, the type of content of transmission of the information transmission data is selected and determined in accordance with the calculated value of the degree of matching. Selection of the destination and content of the information transmission data is performed using the table such as shown in FIG. 6, representing the relation between each of the degree of matching, the destination and the content of the information transmission data. After step #303, the information transmission data selecting process is terminated.

By specific original recognizing unit 106 performing the above described information transmission data selecting process, the destination of the information output to the outside of image processing apparatus 10 is selectively determined in accordance with the degree of matching between the read original and the specific original, and the information is output from information transmitting unit 110 to the determined destination. Information transmitting unit 110 also selectively determines the type (type of transmission content) of the information output outside the image processing apparatus 10 in accordance with the degree of matching between the read original and the specific original. Further, a control for externally outputting simulation information to determine as to whether the state of communication of the externally output information is satisfactory or not is also possible.

Based on the determination of the destination and the type of content of transmission through the process of information transmission data selection as described above, an instruction signal instructing the determined destination and determined type of content of transmission is applied from specific original recognizing unit 106 to information transmitting unit 110.

As described above, in accordance with the degree of matching between the read original and the specific original, the destination of the information transmission data and the type of content of transmission are selected and determined. Therefore, necessary information transmission data can be sent to the necessary site in accordance with the degree of matching between the specific original and the read original.

Figure 8:
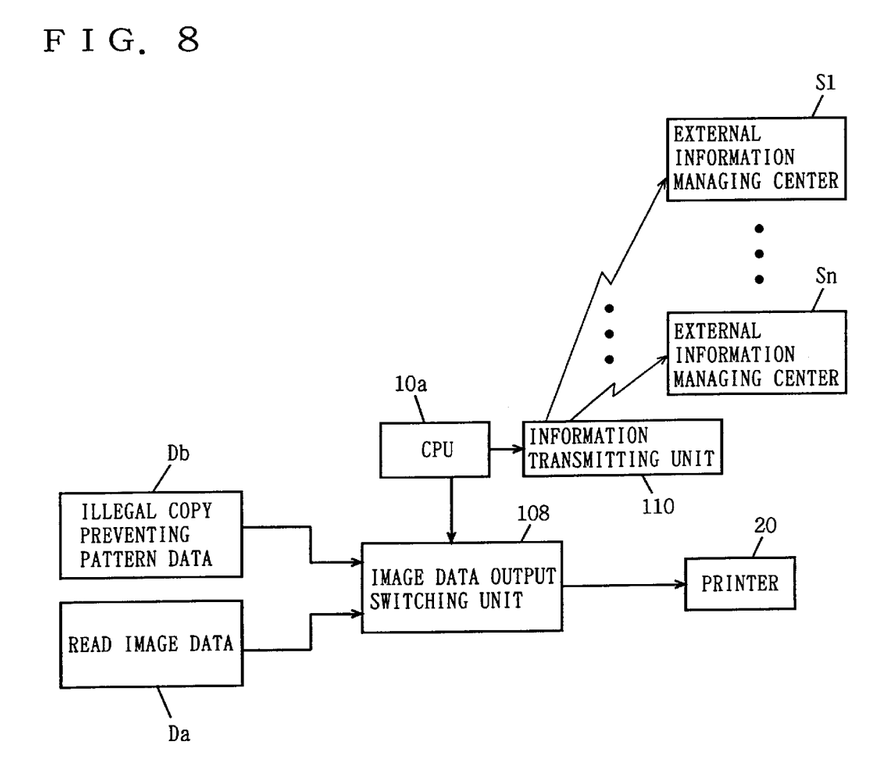
FIG. 8 is a block diagram illustrating the manner of data transmission in an illegal copy preventing process based on the specific original determining process.

The manner of data transmission in the illegal copy preventing process based on the specific original determining process of copying machine 1 in accordance with the present embodiment will be described.

FIG. 8 is a block diagram illustrating the manner of data transmission in the illegal copy preventing process based on the specific original determining process. FIG. 8 shows, in block diagram, the configuration of a main portion related to the illegal copy preventing process.

When it is determined that the specific original is included in the read original, the illegal copy preventing pattern data is output. The operator or the manager looking the output readily notices that the specific original is read by copying machine 1. The output of such an illegal copy preventing pattern data also has an effect of warning to one who makes an attempt to copy the specific original.

Referring to FIG. 8, image data output switching unit 108 is capable of switching the image data to be output between the image data of the read original (hereinafter referred to as read image data) Da and the illegal copy preventing data pattern Db. When the illegal copy preventing process is to be performed, image data output switching unit 108 applies the illegal copy preventing pattern data Db to printer 20 in response to the switching signal applied from CPU 10a of image reading apparatus 10. Further, when the illegal copy preventing process is to be performed, information transmitting unit 110 selectively transmits the information transmission data to external information managing centers S1 to Sn in response to the switching signal applied from CPU 10a.

In this manner, when the illegal copy preventing process is performed, the normal copying operation is not performed and a sheet on which an image of illegal copy preventing pattern data is printed is output from printer 20, so that output of the image data of the read original is inhibited. Therefore, use of the read image data of the specific original can be prevented. Further, when the illegal copy preventing process takes place, the information transmission data indicating reading of the specific original is transmitted from information transmitting unit 110 to external information managing centers S1 to Sn, and therefore reading of the specific original by image reading apparatus 10 can readily be recognized by the external information managing centers S1 to Sn. In this manner, the information transmitting unit 110 externally outputs the information corresponding to the result of determination of the specific original to the outside of image reading apparatus 10.

If the illegal copy preventing process is not performed, the illegal copy preventing pattern data Db and the information transmission data are not output, and in response to the switching signal applied from CPU 10a of image reading apparatus 10, image data output switching unit 108 provides the read image data Da to printer 20. In this manner, when the illegal copy preventing process is not performed, the normal copying operation is performed. Therefore, when the illegal copy preventing process is not performed, the normal copying operation is carried out smooth without any problem.

In the present embodiment, an example has been described in which the information transmission data is externally transmitted only when it is determined that the specific original is included in the read original. However, it is not limiting and the information transmission data may be transmitted regardless of the result of determination as to whether the specific original is included or not, every time collation between the read original and the specific original takes place.

Further, in the present embodiment, an example has been described in which the destination of the information transmission data is external information managing centers. However, it is not limiting, and the destination of the information transmission data may be an alarm or other managing apparatus provided at the site of the copying machine 1. More specifically, the destination of the information transmission data is not limited to such an agency as the external information managing center, and the destination may be any apparatus provided outside the copying machine 1.

When the information transmission data is applied to an alarm, the alarm is used for giving a warning to the user when the degree of matching between the read original and the specific original is relatively low, for example.

Main advantages of the above described embodiments are as follows. When the information transmission data is transmitted, the destination of the information transmission data is selected and determined in accordance with the degree of matching between the read original and the specific original. Therefore, in accordance with the degree of matching between the specific original and the read original, it is possible to send the information transmission data to the necessary site. Further, in addition to the selection and determination of the destination, the type of content of the information transmission data is selected and determined in accordance with the degree of matching between the read original and the specific original. Therefore, in accordance with the degree of matching between the specific original and the read original, the necessary type of information transmission data can be sent to the necessary site.

Further, by transmitting simulation information of the information transmission data from information transmitting unit and monitoring the state of communication of the simulation information, it is possible to determine whether the state of communication of the information transmission data is satisfactory or not.

Other exemplary configurations of the present invention will be briefly described in the following.

The image reading apparatus may include an image data output switching unit 108 for inhibiting output of the original image data read by the above described reading unit 503, when it is determined by the above described specific original recognizing unit 106 that the specific original is included. By this configuration, output of the image data of the read original is inhibited when it is determined by the specific original recognizing unit 106 that the specific original is included, and therefore use of the image data of the read specific original can be prevented.

Further, an image data output switching unit 108 may be provided which outputs a predetermined replacement image data (illegal copy preventing pattern data) other than the specific original, in place of the image data of the original read by the above described reading unit 503 when it is determined by the specific original recognizing unit 106 that the specific original is included. By this configuration, the operator or the manager looking at the output of the replacement image data can readily notice that the specific original is read by the copying machine 1. The output of such a replacement image data also has a function of giving a warning to those who attempt to copy the specific original Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image input apparatus for inputting image data, comprising:
    an input means for inputting said image data;
    a calculating means for comparing thus inputted image data with pre-stored reference data and for calculating a degree of matching between the inputted image data and the pre-stored reference data, said calculated degree of matching being selected from among at least three possible degrees of matching; and
    a control means for selecting, in accordance with the calculated degree of matching, at least one output destination, from a plurality of output destinations, to which information related to the result of calculation is outputted.

2. An image input apparatus according to claim 1, wherein said input means includes an image reader for reading an original image in order to provide the image data.

3. An image input apparatus according to claim 2, further comprising:
    a determining means for determining whether or not the thus read original image is a specific original, based on the degree of matching calculated by said calculating means.

4. An image input apparatus according to claim 1, wherein said plurality of output destinations are external information managing centers connected to said image input apparatus to allow communication therebetween.

5. An image input apparatus according to claim 4, wherein said control means determines whether or not a state of communication is satisfactory, prior to outputting the information related to the result of calculation, by outputting simulation information to said external information managing centers.

6. An image input apparatus according to claim 1, wherein said control means selects an increasing number of said plurality of output destinations, to which information related to the result of calculation is outputted, as the calculated degree of matching increases.

7. An image input apparatus according to claim 1, wherein said control means changes a content of the information, to be outputted, in accordance with the calculated degree of matching.

8. An image input apparatus for inputting image data, comprising:
    an input means for inputting said image data;
    a calculating means for comparing thus inputted image data with pre-stored reference data for calculating a degree of matching between the inputted image data and the pre-stored reference data; and
    a control means for determining, in accordance with the calculated degree of matching, at least one output destination to which information related to the result of calculation is outputted;
    wherein said pre-stored reference data includes a plurality of said pre-stored reference data prepared in advance, said plurality of pre-stored reference data being referred to in a prescribed order by said calculating means for calculation, and wherein said calculating means compares said inputted image data with said plurality of pre-stored reference data, the prescribed order of the plurality of pre-stored reference data being changed in accordance with an environment of use of the image input apparatus.

9. An image reading apparatus, comprising:

a reading means for reading an original image and converting the original image to image data;

a storing means for storing determination reference data for determining whether or not said original image is a specific original;

a specific original determining means for determining whether or not the original image is the specific original, by collating the image data from the reading means with the determination reference data;

an information output means for outputting information, corresponding to determination results, to at least one of a plurality of output destinations which are outside of the image reading apparatus; and a control means for calculating a degree of matching between the image data from the reading means and the determination reference data, and for changing a number of said output destinations to which the information from said information output means is outputted in accordance with the degree of matching, said calculated degree of matching being selected from among at least three possible degrees of matching.

10. An image forming apparatus including an image reading apparatus according to claim 9, further comprising:

a printer for printing the original image read by the reading means, wherein a printing operation by said printer is inhibited when said specific original determining means determines that the original image is the specific original.

11. An image forming apparatus including an image reading apparatus according to claim 9, further comprising:

a printer for printing the original image read by said reading means, wherein said printer prints a predetermined image different from the original image in order to prevent illegal printing of the read original image, when it is determined by said specific original determining means that the original image is the specific original.

12. An image reading apparatus, comprising:

a reading means for reading and converting an original image to image data;

a storing means for storing determination reference data for determining whether said original image is a specific original or not;

a specific original determining means for determining whether the original image is the specific original or not, by collating the image data from the reading means with said determination reference data;

an information output means for outputting information; and a control means for calculating a degree of matching between the image data from the reading means and the determination reference data, wherein said control means selects at least one output destination, from a plurality of output destinations, to which information from said information output means is outputted in accordance with the degree of matching, said plurality of output destinations being at least one external information managing center connected to said image reading apparatus to allow communication therebetween, said calculated degree of matching being selected from among at least three possible degrees of matching; and wherein said information output means outputs information, corresponding to the thus calculated degree of matching, to said at least one output destination.

13. An image reading apparatus according to claim 12, wherein said at least one external information managing center includes a plurality of external information managing centers, and wherein said control means selects an increasing number of said plurality of external information managing centers to which the information is outputted, in accordance with an increase in the degree of matching.

14. An image reading apparatus according to claim 12, wherein said control means changes the content of information outputted from said information output means, in accordance with the degree of matching.

15. An image reading apparatus according to claim 12, wherein said control means determines whether or not a state of communication is satisfactory, by outputting simulation information from the information output means, prior to outputting the information corresponding to determination results.

16. An image forming apparatus including an image reading apparatus according to claim 12, further comprising:

a printer for printing the image data from said reading means, wherein a printing operation by said printer is inhibited when it is determined by said specific original determining means that the original image is the specific original.

17. An image forming apparatus including an image reading apparatus according to claim 12, further comprising:

a printer for printing the image data from said reading means, wherein said printer prints a predetermined image different from the original image, when it is determined by said specific original determining means that the original image is the specific original.

18. An image reading apparatus comprising:

a reading means for reading and converting an original image to image data;

a storing means for storing determination reference data for determining whether said original image is a specific original or not;

a specific original determining means for determining whether the original image is the specific original or not, by collating the image data from the reading means with said determination reference data;

an information output means for outputting information, corresponding to determination results, to an external information managing center; and a control means for calculating a degree of matching between the image data from the reading means and the determination reference data, wherein said control means determines at least one output destination for outputting information from said information output means in accordance with the degree of matching;

wherein said storing means stores a plurality of determination reference data, and wherein said specific original determining means changes an order of reference of the plurality of determination reference data in accordance with an environment of use of said image reading apparatus.

* * * * *